Aug. 9, 1955 J. S. BRYAN 2,715,155

ELECTRICAL SYSTEMS

Filed July 11, 1952

INVENTOR.
JAMES S. BRYAN

BY

[signature]

ATTORNEY

United States Patent Office 2,715,155
Patented Aug. 9, 1955

2,715,155

ELECTRICAL SYSTEMS

James S. Bryan, Philadelphia, Pa., assignor to Philco Corporation, Philadelphia, Pa., a corporation of Pennsylvania Application July 11, 1952, Serial No. 298,248
16 Claims. (Cl. 178—5.4)

Figures 1, 2:
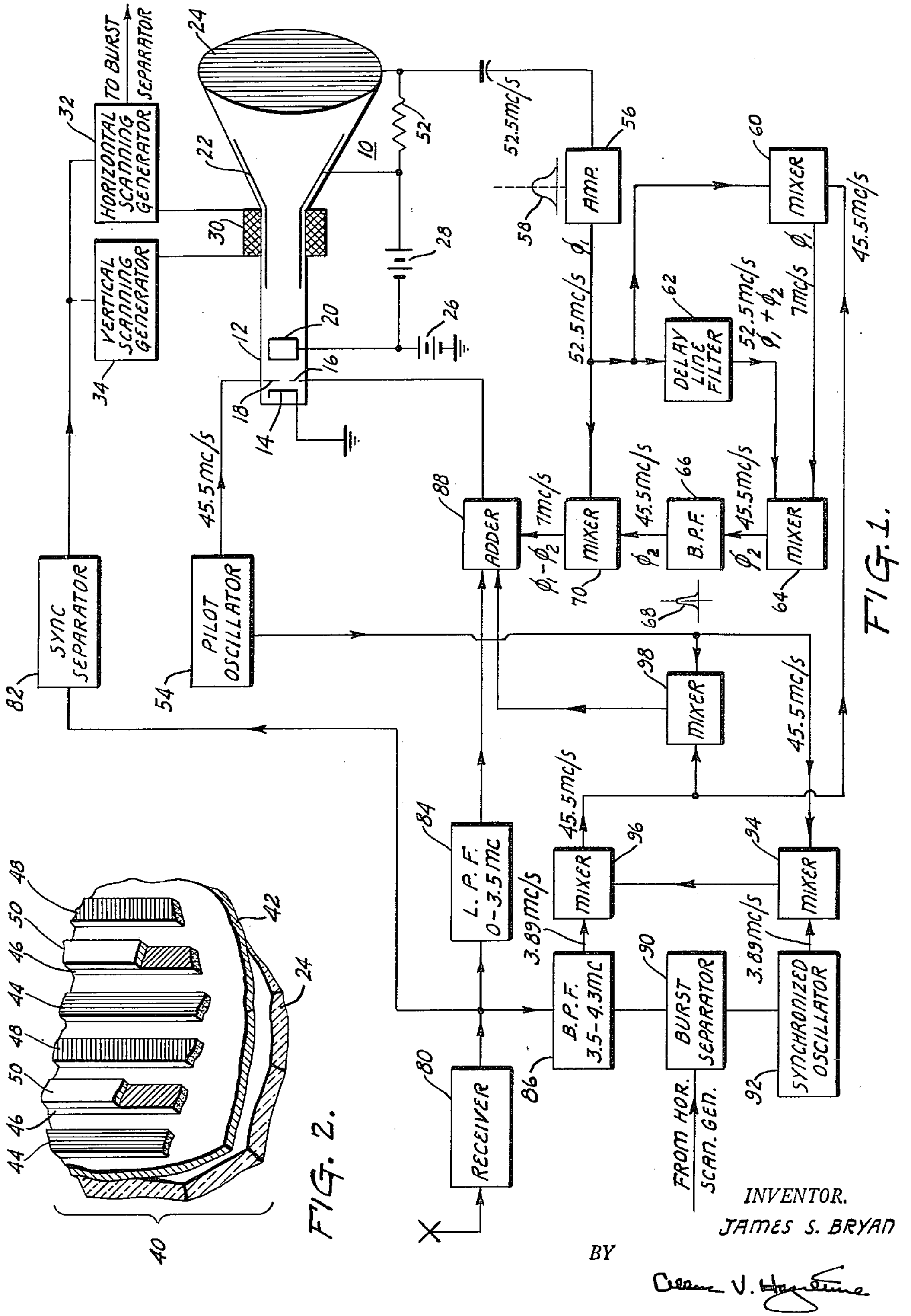

The present invention relates to electrical systems and more particularly to cathode-ray tube systems comprising a beam intercepting structure and indexing means arranged in cooperative relationship with the beam intercepting structure and adapted to produce a signal whose time of occurrence is indicative of the position of the cathode-ray beam.

The invention is particularly adapted for, and will be described in connection with, a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normal horizontally-scanning cathode-ray beam produces red, green and blue light successively. From a color television receiver there may then be supplied a video signal wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by means of appropriate camera units producing three signals indicative of three color-specifying parameters of successively scanned elements of a televised scene. These three signals are preferably such as to specify the image colors with respect to three imaginary color primaries "X," "Y" and "Z" as defined by the International Commission on Illumination (ICI). With this choice of primaries, the Y signal represents the brightness of the image as perceived by the human eye, while the X and Z signals contain the remaining intelligence as to image color. Since the specification of any color in terms of any given set of primaries may be converted to a specification of the same color in terms of any other set of primaries by means of linear transformations, the transmission of the X, Y and Z signals makes available at the receiver all of the required information necessary to excite the three real primary-color sources of the image reproducing cathode-ray tube.

In a preferred arrangement for segregating and apportioning the intelligence concerning the X, Y and Z components of the color image at the transmitter, these components are combined to form two difference signals (X—Y) and (Z—Y) which are transmitted in different phase relations as amplitude-modulation of a subcarrier signal. The Y signal is then transmitted in the frequency band located below that of the modulated subcarrier. The modulation of the subcarrier is preferably effected by means of balanced modulators, so that no subcarrier signal is generated when the difference signals (X—Y) and (Z—Y) are zero, i. e. when image elements which are white or gray are scanned. However, when colored image elements are scanned, either or both of the difference signals (X—Y) and (Z—Y) will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered as a chromaticity signal having a phase and amplitude representative of the hue and saturation respectively, of the color of the image.

The instantaneous amplitude of the video signal will be a function of the magnitudes of the three components thereof and of the absolute phase positions of the two components constituting the modulated subcarrier signal, and at any given instant the amplitude is indicative of the intensity of one of the primary color constituents of an element of the image to be reproduced. For proper color rendition, it is required that, as the phosphor stripe producing a given one of the primary colors of light of a particular image element is impinged by the cathode-ray beam, the intensity of the beam be simultaneously controlled in response to the contemporaneous value of the video signal representing the corresponding color component of the televised image. Such a synchronous relationship may be maintained throughout the scanning cycle by deriving indexing signals indicative of the instantaneous position of the cathode-ray beam upon the image-forming screen, and by utilizing these signals to control the relative phase of the video wave. The said indexing signals may be derived from a plurality of stripe portions arranged on the beam intercepting screen structure, each adjacent to a color triplet so that, when the beam scans the screen, the indexing portions are excited in spaced time sequence relative to the scanning of the color triplets and a series of pulses is generated in a suitable output electrode system of the cathode-ray tube.

The indexing portions may comprise stripes of a material having secondary-emissive properties which differ from the secondary-emissive properties of the remaining portions of the beam intercepting structure. For example, such indexing portions may consist of stripes of a high atomic number material such as gold, platinum or tungsten or may consist of certain oxides such as cesium oxide or magnesium oxide. Alternatively, the indexing portions may consist of stripes of fluorescent material, such as zinc oxide, having a spectral output in the non-visible light region and the indexing signals may be derived from a suitable photo-electric cell arranged, for example, in a side wall portion of the cathode-ray tube out of the path of the cathode-ray beam and facing the beam intercepting surface of the screen structure.

To achieve a desired degree of definition comparable to that commonly available in so-called black-and-white image reproducers, the image reproducing screen of the cathode-ray tube should contain a relatively large number of groups of phosphor stripes. In the case of a cathode-ray tube screen constituted by vertically arranged color triplets, the number of triplets should correspond to the number of picture elements contained in one line scan of the reproduced image and in a typical case there may be approximately 400 to 450 color triplets arranged on the screen of the cathode-ray tube.

As a general rule, the rate at which the beam scans the phosphor stripes and the associated indexing portions can be maintained constant only within certain tolerance values. This is due to the fact that the phosphor stripes and the indexing portions are normally deposited on the screen surface with only a certain degree of precision dictated by economic considerations and manufacturing tolerances so that a non-uniform distribution of the stripes on the screen surface can normally be expected, Furthermore, in order to achieve a uniform scanning velocity, it is necessary that the beam deflection signal conform absolutely to a preestablished waveform determined by the geometry of the tube. In this connection, it will be noted that, when the cathode-ray tube is sufficiently long and/or has a sufficiently small screen area, so that the normally aspheroidal screen surface is in effect concentric to the effective deflection center of the scanning beam, the deflecting signal must exhibit a linearly varying amplitude. When the screen has approximately 400 color triplets arranged thereon, this linearity must be held to a tolerance of the order of one part in 12,000 to achieve faithful color reproduction. In practice, this problem is much more severe because, desirably, the cathode-ray tube is made relatively short and/or has a large screen area so that the aspheroidal surface of the screen departs considerably from concentricity to the effective deflection center of the beam. In this case, the deflection of the beam at constant velocity over the surface of the screen requires a deflection signal having a more complex waveform and the difficulty of generating such a signal within the necessary close tolerance value is correspondingly increased.

The departures from constant velocity as the beam scans the screen structure produces corresponding changes in the frequency of the indexing signal produced by the screen structure.

In the copending application of E. M. Creamer, Jr. et al., Serial No. 240,324, filed August 4, 1951 there have been described systems by means of which the desired indexing information can be obtained in a readily usable form. More particularly, and in accordance with the principles set forth in the said copending application, use is made of the finding that the scanning of the indexing stripes by the electron beam produces, in the collector circuit of the cathode-ray tube, signal components which represent modulation products as determined by the intensity variations of the beam and the rate of scanning the index stripes. Accordingly, by additionally varying the intensity of the beam at a pilot carrier rate widely different from the rate at which the beam intensity is varied by the video signal, an output signal is produced in the collector electrode of the cathode-ray tube comprising, as one component, modulation products proportional to the pilot carrier frequency and the rate of scanning the index stripes. Because the frequencies of these modulation products are widely different from the frequencies of any modulation products brought about by the video signal variations of the beam, the former may be separated from the latter by suitable frequency discriminating means. These pilot carrier modulation products consist essentially of a carrier wave at the pilot carrier frequency and sideband signals representing the sum and difference of the pilot carrier frequency and the rate of scanning the index stripes. Since any change in the rate of scanning the index stripes will be indicated by a change in the frequencies of the sideband signals, the separated signal or one of its sidebands may be used as an indexing signal.

The indexing signal, generated by the action of the scanning beam on the screen structure, is a low intensity signal and must be appropriately amplified to make it suitable for controlling the phase of the video signal applied to the beam intensity controlling system in the desired synchronous relationship to the position of the scanning beam. In addition, it is desirable to filter and limit the generated indexing signal to separate it from undesired components also generated at the screen structure by the scanning beam. The selective circuits commonly available for this purpose generally apply a phase shift to the indexing signal which varies as a function of the frequency thereof so that the processed signal may no longer be in phase coincidence with the generated indexing signal for all frequency values of the generated signal. In some instances, these undesired phase shifts of the processed indexing signal may be sufficient to produce a serious error of color synchronization between the impingement of the beam on the different color phosphor stripes and the control of its intensity by the color video signal applied to the intensity control system of the cathode-ray tube.

In the copending application of Sergio F. Valdes, Serial No. 294,633, filed June 20, 1952, there is described a cathode-ray tube indexing signal system in which the desired amplification of the indexing signal is produced by an amplifying system having a constant phase shift as a function of frequency throughout the frequency range of the indexing signal. In order to achieve a constant phase shift over the frequency range of the indexing signal, the amplifier is made to exhibit a bandpass characteristic which is wider than that necessary to pass the indexing signal. Undesired signals such as undesired intermodulation products produced at the screen structure, may be attenuated by suitable trap circuits tuned to frequencies at the edges of the pass band spectrum so that the pass band characteristic of the amplifier exhibits sharp attenuation skirts. As set forth in the said copending application, it is found that an amplifier having the above noted phase characteristic and limited transmission spectrum may exhibit a response which is greater at the edges of the bandpass characteristic than at the central portion thereof so that the components of noise generated by the indexing structure having frequencies at the edges of the pass band may be amplified to a greater extent than the desired indexing signal. In some cases, the degree to which the noise components are thus selectively amplified may be sufficient to mask or at least degrade the desired indexing signal to a greater or lesser extent.

In order to attenuate these noise components, the indexing signal system disclosed in the said Valdes application embodies a frequency selective circuit to which the amplified signal is applied. While this frequency selective circuit applies a phase shift to the indexing signal which varies as a function of the frequency thereof, the system described in the said copending application further embodies a novel heterodyning system by means of which this phase shift may be compensated by a correction signal derived from the phase shifted indexing signal.

In practice, the use of a wide band amplifier having a constant phase shift over the desired operating range and having the desired sharp attenuation characteristic at the edges of the pass band is costly. In addition, the undesired noise components may be amplified to a level sufficient to cause radiation from the amplifier and thereby cause interference in adjacent circuits, so that it is desirable to attenuate the undesired signal components as close to the source thereof as possible. Furthermore, whereas in the system disclosed in the said Valdes application, the phase shift applied to the indexing signal by the frequency selective circuit is compensated by a signal derived from the phase shifted signal, in certain circuit applications it may be desirable to achieve the desired compensation independently of the phase shifted signal. Under this conditon the amount of compensation produced may readily be controlled so that it is readily possible to produce an overcompensation effect such as would be desirable in those instances in which the indexing signal is subjected to additional phase shifts in the circuitry in which it is subsequently used.

It is an object of the invention to provide improved cathode-ray tube systems of the type in which the position of an electron beam on a beam intercepting screen structure is indicated by an indexing signal derived from an indexing component of the screen structure.

A further object of the invention is to provide improved cathode-day tube systems of the foregoing type in which an indexing signal is provided which is substantially free of contaminating noise components having frequencies approximating the frequency values of the indexing signal.

Another object of the invention is to provide improved cathode-ray tube systems in which undesired phase variations of the indexing signal normally produced in the processing of the indexing signal are nullified.

Another object of the invention is to provide a color television cathode-ray reproducing system in which accurate color rendition is achieved notwithstanding non-uniformities of the distribution and of the scanning of the color reproducing elements of the image screen of the cathode-ray tube.

A further object of the invention is to provide an improved index signal producing system for cathode-ray tubes, in which system phase variations of the indexing signal normally produced in the processing of the indexing signal may be compensated to any desired degree.

Still another object of the invention is to provide improved indexing signal producing systems for cathode-ray tubes in which undesired signal components normally generated by the source of the indexing signal are attenuated at low amplitude levels and in which the need for relatively expensive wide-band phase-shift-free amplifying systems is obviated.

Further objects of the invention will appear as the specification progresses.

In accordance with the invention, the foregoing objects are achieved in a cathode-ray tube system adapted to generate an indexing signal having variations, the nominal time phase positions of which are indicative of the position of the beam, by means of an indexing system in which the generated indexing signal is supplied to a frequency selective circuit which transmits the desired indexing signal to the exclusion of undesired signals and normally imparts to the transmitted signal a phase shift as determined by the frequency variations of the indexing signal and the characteristic of the selective circuit. The system of the invention further comprises means to produce, from the phase shifted indexing signal, a first heterodyne signal having the frequency and phase variations of the phase shifted signal, and means to produce a compensating signal having the frequency and phase variations of the phase shifted indexing signal and having further phase variations as a function of the frequency thereof as determined by the desired degree of compensation to be applied to the phase shifted indexing signal. By means of a heterodyning system the first heterodyne signal and the compensating signal are combined to produce a second heterodyne signal which is free from the phase variations exhibited by the phase shifted indexing signal and contains the phase variations supplied to the compensating signal. By means of an additional heterodyning system, the above noted second heterodyne signal is combined with the phase shifted indexing signal to produce an output signal having the frequency variations of the indexing signal indicative of the position of the beam and having the phase variations of the indexing signal compensated to a desired degree as determined by the further phase variations supplied to the compensating signal.

The invention will be described in greater detail with reference to the appended drawings forming part of the specification and in which:

Figure 1 is a block diagram, partly schematic, showing a preferred embodiment of a cathode-ray tube system in accordance with the invention; and Figure 2 is a perspective view of one form of an image reproducing screen structure suitable for the cathode-ray tube systems of the invention.

Referring to Figure 1, the cathode-ray tube system there shown comprises a cathode-ray tube 10 containing within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope and terminates at a point spaced from the end face 24 of the tube in conformance with well established practice. Suitable forms of construction for the dual beam generating system have been described in the copending application of M. E. Partin, Serial No. 242,264 filed August 17, 1951 and a further description thereof herein is believed to be unnecessary. Electrodes 20 and 22 are maintained at their desired operating potentials by suitable voltage sources shown as batteries 26 and 28, the battery 26 having its positive pole connected to the anode 20 and negative pole connected to a point at ground potential and the battery 28 being connected with its positive pole to electrode 22 and its negative pole to the positive pole of battery 26.

A deflection yoke 30 coupled to horizontal and vertical deflection signal generators 32 and 34 respectively, of conventional design, is provided for deflecting the dual electron beams across the face plate 24 of the tube to form a raster thereon.

The end face plate 24 of the tube 10 is provided with a beam intercepting structure 40, one suitable form of which is shown in Figure 2. In the arrangement shown in Figure 2, the structure 40 is formed directly on the face plate 24. However, it should be well understood that the structure 40 may be formed on a suitable light transparent base which is independent of the face plate 24 and may be spaced therefrom. In the arrangement shown, the face plate 24, which in practice consists of glass having preferably substantially uniform transmission characteristics for the various colors of the visible spectrum, and having a light transparent electrically conductive coating 42, which may be a coating of stannic oxide or of a metal such as silver having a thickness only sufficient to achieve the desired conductivity, is provided with a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which upon electron impingement produces red light, the stripe 46 may consist of a phosphor such as zinc orthosilicate, which produces green light, and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the face plate 24, and further details concerning the same are believed to be unnecessary.

Each of the groups of stripes may be termed a color triplet, and, as will be noted, the sequence of the stripes is repeated in consecutive order over the area of the structure 40.

Arranged over consecutive stripes 46 are indexing stripes 50 consisting of a material having a secondary-emissive ratio detectably different from that of the remainder of the structure 40. The stripes 50 may be of gold or of other high atomic number metal such as platinum or tungsten, or may be of an oxide such as magnesium oxide as previously pointed out.

The beam intercepting structure so constituted is connected to the positive pole of battery 28 through a load impedance 52 by means of a suitable connection to the conductive coating 42 thereof.

Since the dual cathode-ray beams are deflected by the common deflection yoke 30, they simultaneously scan the beam intercepting structure 40, and indexing information derived from one of the beams may be used to establish the position of the other beam. When one of the beams, such as the beam under the control of the electrode 18 is varied in intensity at a pilot frequency, for example by means of a pilot oscillator 54, the so varied beam generates across the load resistor 52, an indexing signal comprising a carrier component at the pilot frequency and sideband components representing the sum and difference frequencies of the pilot frequency and the rate at which the index stripes are scanned by the beam as described in the above-mentioned copending application of E. M. Creamer, Jr., et al.

In a typical case, the pilot frequency variations of the intensity of the beam may occur at a frequency of 45.5 mc./sec. and, when the rate of scanning the index stripes 50 is approximately 7 million per second as determined by the horizontal scanning rate and the number of index stripes 50 impinged per scanning period, a modulated signal at 45.5 mc./sec. and having sideband components at approximately 38.5 mc./sec. and 52.5 mc./sec. is produced across the load resistor 52. Changes in the rate of scanning the index stripes 50 due to non-linearities of the beam deflection and/or non-uniformities of the spacing of the index stripes produce corresponding changes in the frequencies of the sideband components about their respective nominal values so that one of the sidebands may be used as an indexing signal. In the arrangement specifically shown in Figure 1, the upper sideband component, i. e. the sideband component at approximately 52.5 mc./sec., is used as the indexing signal.

The indexing signal at approximately 52.5 mc./sec. is preferentially selected from the components generated across load impedance 52 by means of an amplifier 56 having a restricted pass band characteristic centered about the nominal frequency of the desired indexing signal component as shown by the curve 58 arranged adjacent to the amplifier. It is found that, because of its relatively narrow bandwidth, amplifier 56 imparts a phase shift $\phi_1$ to the transmitted indexing signal which varies as a function of its frequency. In some instances this phase shift may be sufficient to produce a serious error of color synchronization between the position of the beam on the screen structure and the contemporaneous value of the color video signal applied to the intensity control system of the cathode-ray tube.

In accordance with the invention, this undesired phase shift is compensated by a frequency heterodyne system in which the phase shifted indexing signal is combined in phase subtractive relationship with a second signal which is derived from the indexing signal and which has a compensating phase shift applied to it independently of the phase shift characterizing the indexing signal appearing at the output of amplifier 56. More particularly, in the system shown in Figure 1, the output of amplifier 56 is combined in a heterodyne mixer 60 with a signal having a nominal frequency equal to that of the pilot oscillator 54 and derived in a manner later to be more fully described, to produce a first difference frequency signal containing the frequency variations and the phase shift characterizing the signal at the output of amplifier 56 and further containing the color information to be applied to the cathode-ray tube 10. For the frequency values above specifically illustrated, this heterodyne difference frequency signal may have a nominal frequency of 7 mc./sec. The signal at the output of amplifier 56 is also supplied to a delay line filter 62 which applies to the signal an additional phase shift $\phi_2$ as determined by the frequency thereof and by the characteristic of the filter so that the signal at the ouput of filter 62 has frequency variations about its nominal frequency as determined by the frequency variations of the signal at the ouput of amplifier 56 and exhibits phase shifts $\phi_1$ and $\phi_2$ as determined by the characteristics of amplifier 56 and filter 62 respectively, as a function of the frequency of the signal.

The design of the delay line filter 62 may conform to standard practice and, in a typical case, the filter may consist of a multiple tuned circuit, the overall resonant frequency of which is equal to the nominal frequency of the signal applied thereto, and having a pass band sufficient to transmit all frequency values of the applied input signal. In those instances in which the phase shift $\phi_2$ to be produced is equal to the phase shift $\phi_1$ produced by amplifier 56, the filter 62 may be identical to the bandwidth limiting filter embodied in the amplifier 56. When the desired phase shift $\phi_2$ is to be greater or smaller than the phase shift $\phi_1$, appropriate modifications to the characteristics of the filter 62 may be made in the manner well known to those skilled in the art.

The output of mixer 60 is supplied to a second mixer 64 together with the output of filter 62 to produce a second difference frequency signal, i. e. a signal having a nominal frequency of 45.5 mc./sec. It will be noted that this second difference frequency signal carries with it the phase shift $\phi_2$ produced by the filter 62 and the color information contained on the 7 mc./sec. signal appearing at the output of mixer 60. However, this second difference frequency signal is substantially free from the frequency variations due to the indexing information and the phase shift $\phi_1$ because the frequency variations and the phase shift $\phi_1$ of the two signals applied to mixer 64 are in the same sense, and are cancelled by the subtractive heterodyne action of the mixer 66.

The second heterodyne signal so produced may then be applied to a bandpass filter 66 having a relatively sharp pass band characteristic as shown at 68 which serves to limit the phase correcting signal to a band of frequencies corresponding to the band of frequencies of the indexing signal over which phase shift correction is desired. Since the signal applied to bandpass filter 66 is substantially free from frequency variations corresponding to the indexing information, there will be substantially no further phase shift applied to the signal so that the output signal will contain the phase shift $\phi_2$ substantially unmodified.

There is thus seen to exist in the system, at the output of amplifier 56, a signal containing the indexing information in the form of frequency variations about a nominal frequency value of 52.5 mc./sec. and further containing a phase shift $\phi_1$ varying as a function of frequency as determined by the phase shift characteristic of the amplifier 56. There also exists in the system, at the output of filter 66, a signal at a frequency of 45.5 mc./sec., which signal is substantially free from frequency excursions due to the indexing information, contains a phase shift $\phi_2$ as a function of frequency as determined by the filter 62 and contains the color information of the image to be reproduced. These two signals are applied to a mixer 70 to produce a difference frequency signal at 7 mc./sec. This latter difference frequency signal contains the indexing information in the form of frequency variations about the nominal frequency value thereof and contains the color information carried by the wave applied to mixer 60. It will further be noted that, in view of the heterodyne action which takes place in mixer 70, the phase shifts of the two signals applied thereto are combined in subtractive manner so that the 7 mc./sec. signal at the output of mixer 70 has a phase shift equal to $\phi_1 - \phi_2$. By adjusting the phase shift $\phi_2$ produced by filter 62 to be equal to that produced by amplifier 56 so that $\phi_1$ equals $\phi_2$, this difference may be reduced to zero so that the 7 mc./sec. signal is free of phase shift. Similarly, by adjusting the phase shift $\phi_2$ produced by filter 62 to be greater than $\phi_1$, the phase shift $\phi_1$ may be over-compensated to any desired degree. This latter modification may be desirable in those instances when the mixer 70 is followed by circuitry which applies a further phase shift to the signal processed as a function of the frequency thereof, whereby such subsequently produced phase shifts may thus be compensated. The signal produced at the output of mixer 70 is accordingly a signal having a frequency equal to the rate at which successive color triplets of the image intercepting screen 40 (see Figure 2) are scanned by the electron beam and the successive color establishing components thereof have a phase position as established by the indexing signal.

The heterodyne mixers 60, 64 and 70 may conform to standard practice and may each consist for example, of a dual grid thermionic tube, to the different grids of which the two input signals are supplied. Each of the mixers may contain an output circuit broadly tuned to the frequency of the desired output signal, whereby the desired heterodyne frequency signal may be preferentially selected.

For supplying a color video wave to the control grid 16 there is provided a receiver 80 which may be of conventional design and include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color establishing component of the color video wave, such a marker signal being usually in the form of a burst of a small number of cycles of carrier signal having a frequency equal to the frequency of the chromaticity subcarrier component of the video wave and occurring during the so-called back porch interval of the horizontal scanning pulses.

The synchronizing pulses contained in the received video signal are selected by a sync signal separator 82 of conventional form and subsequently energize, in well known manner, the horizontal and vertical scanning generators 32 and 34.

The video color wave may be formed at the transmitter in a number of different manners. Preferably the video wave is generated at the transmitter in accordance with the principles set forth in the copending application of Frank J. Bingley, Serial No. 225,567, filed May 10, 1951. As described in said application the image to be televised is resolved into three color signals, one of which signals is proportional to the energy distribution of the light emitted by the image as weighted by a color mixture curve having a shape and ordinate scale substantially identical to the shape and ordinate scale of the curve of the relative luminosity of the spectral colors to the eye. The second and third color signals are made proportional, respectively, to the energy distribution of the light emitted by the image as weighted by second and third color mixture curves having shapes and ordinate scales complementing the shape and ordinate scale of the first curve. The first of these signals accordingly defines the brightness of the image elements and is a signal having a relatively large bandwidth, whereas the remaining two signals define, with the first signal, the chromaticity of the image and need only be of a relatively small bandwidth. In one of the systems specifically described in the said Bingley application, the first of the said signals is utilized directly to form one component of the color video wave without being previously modulated, and the second and third signals, modified by the first signal to produce two difference signals, are modulated in phase quadrature on a subcarrier to produce the modulated wave component of the color video wave.

The video color wave is separated into its two components by means of a low pass filter 84 and a bandpass filter 86, whereby, at the output of filter 84, there is derived the low frequency component of the video wave containing the brightness information of the image, and at the output of the filter 86 there is derived the modulated subcarrier component of the video wave indicative of the chromaticity information of the image and the marker signal. The frequency pass bands of the filters 84 and 86 are selected in consonance with the standards of the transmission system and a typical value for the pass band of filter 84 is 0 to 3.5 mc./sec. and for the filter 86 is 3.5 to 4.3 mc./sec. when the subcarrier frequency of approximately 3.89 mc./sec. is used at the transmitter.

The brightness signal is supplied to the control grid 16 of the tube 10 through an adder 88 having a plurality of inputs and a common output and consisting, in a typical case, of a plurality of thermionic tubes, the input grid circuits of which are separately energized by the respective input signals applied to the adder and the output anode circuits of which are supplied through a common load impedance.

The chromaticity information is supplied to the electrode 16 from the mixer 70 which forms a second input to the adder 88 and, as previously indicated, this chromaticity information is derived from a signal applied to the mixer 60. This latter signal, having a carrier frequency of 45.5 mc./sec., is derived from the modulated subcarrier of the video wave by means of a system comprising a burst separator 90, a synchronized oscillator 92 and heterodyne mixers 94 and 96.

The burst separator 90 operates to separate the marker signal from the video wave by providing a gated path for the applied input signal during the time of occurrence of the marker signal. Such a gate may consist for example, of a dual grid electron discharge tube having one control grid which is coupled to the output of the bandpass filter 86 and a second control grid so negatively biased as normally to prevent conduction through the tube. The tube is made conductive at the proper instant, i. e. during the back porch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof, i. e. the separator may contain a resonant circuit which is tuned to the frequency of the marker signal and which is connected to the anode of the tube.

The marker signal so provided is applied to the oscillator 92 which is adapted to generate a signal having a frequency and a phase position as established by the frequency and phase position of the marker signal applied to the input thereof. In a suitable form the oscillator 92 may be of the type described in the copending application of Joseph C. Tellier, Serial No. 197,551 filed November 25, 1950.

The output of oscillator 92 is applied to the heterodyne mixer 94 together with a signal from the pilot oscillator 54 to produce a heterodyne signal at 49.39 mc./sec., which signal has the color phase information as established by the color phase marker signal derived from the receiver 80. This heterodyne signal is in turn supplied to a heterodyne mixer 96 together with the color modulated subcarrier of the video wave as derived from the bandpass filter 86 to produce an output wave at the frequency of the pilot wave from oscillator 54, i. e. an output wave at 45.5 mc./sec. This latter output wave exhibits phase and amplitude variations as determined by the phase and amplitude variations of the color modulated subcarrier derived from the bandpass filter 86, and the absolute phase position of these variations are established with reference to the brightness signal from low pass filter 84 by means of the color marker signal.

The heterodyne mixers 94 and 96 may be of conventional form and may each consist of a dual grid tube as previously described in connection with the mixers 60, 64 and 70.

The chromaticity information impressed on the signal, at the pilot frequency as above described, is applied to the mixer 60. In the manner previously described, this information is combined with the indexing information derived from the amplifier 56 to produce a signal the color information of which is arranged in synchronism with the scanning of the beam under the control of the electrode 16, the so synchronized information being applied to the control electrode 16 from the mixer 70 through the adder 88.

When the information at the output of the low pass filter 84, and the chromaticity information appearing on the color subcarrier derived from bandpass filter 86, are in terms of the imaginary color primaries X, Y and Z, as in the case of the preferred receiving system above specifically described, it may be necessary to modify these signals to make them conform to the particular real primary colors, R, G and B characterizing the phosphor stripes utilized in the screen assembly 40 (see Figure 2) of the cathode-ray tube. This may be accomplished by synchronously detecting the color carrier at a particular phase and adding the detection products in proper relative amounts to the imaginary color primary signals. For example, as shown in Figure 1, the color modulated wave at the pilot frequency as derived from the mixer 96, and a demodulating signal at the pilot frequency as derived from the oscillator 54, may be synchronously detected by a mixer 98 and the detected products so produced applied as an additional input to the adder 88. The mixer 98, which may consist of a dual grid tube as in the case of the mixers previously described, may include a conventional phase shifter for either or both of the input signals thereof to vary the relative phases of the signals, and may further include an amplifier in the output circuit to establish the amplitude of the output signal at the proper value relative to the amplitudes of the signals supplied to the adder 88 from the low pass filter 84 and the mixer 72. As will be apparent to those skilled in the art, the actual value of the phase shift and the amplification taking place in the mixer 98 is determined by the particular primary colors produced by the cathode-ray tube 10 and these quantities may be readily calculated. The transformation from a color system based on primaries X, Y and Z to a specific real primary color system may be achieved in ways other than that above specifically described. Such other methods, which form no part of the present invention, need not be specifically described herein. However, for the cake of completeness reference is made to the copending application of E. M. Creamer, Jr., Serial No. 256,526 filed November 15, 1951 describing several such alternate methods.

Various modifications of the specific embodiment of the invention above described may be readily derived by those skilled in the art without departing from the underlying principles thereof. More particularly, whereas in the system of Figure 1, the mixer 60 is supplied with a color signal produced as a heterodyne modulation product of the color subcarrier and the pilot signal from oscillator 54, so that the color information is combined with the indexing information and appears at the output of mixer 70, it will be evident that alternatively the mixer 60 may be supplied by a signal derived solely from the oscillator 54. In such a modification, the output of mixer 70, which in this case contains only the indexing information, may then be combined with the color information. This may be achieved by supplying the mixer 94 with the 7 mc./sec. output signal from mixer 70 instead of the 45.5 mc./sec. signal from the oscillator 54. Under these conditions, the output of mixer 96 will be a 7 mc./sec. signal containing the color and indexing information which may be supplied directly to the adder 88. The transformation of the color system from primaries based on X, Y and Z to specific real primaries may be accomplished by an appropriate system adapted to this modified mode of operation, such as by the square law detection method described in the said copending application of E. M. Creamer, Jr., Serial No. 256,526.

Alternatively, in a system in which the receiver 80 provides three video waves, each indicative of the amplitude of a different one of the primary color components of the image, the 7 mc./sec. signal from the output of mixer 70, containing only indexing information in accordance with the above described modification, may be used as a modulating or switching signal to consecutively apply the color video waves to the control electrode 16 through suitable modulators energized by the respective video waves and by the 7 mc./sec. signal supplied thereto through appropriate phase shifters.

Briefly summarizing the system specifically shown in Figure 1, it will be seen that there is produced by the amplifier 56 a first signal having a first given nominal frequency value and undergoing frequency variations as determined by variations of the rate of scanning the indexing stripes of the screen structure 24 of the tube 10. This first signal is further characterized by phase variations as determined by its frequency variations due to the phase shifting characteristic of the amplifier 56. By means of the delay line filter 62 a second signal is produced having the frequency and phase variations characterizing the signal at the output of amplifier 56 and having further phase variations as determined by the frequency variations of the applied signal and by the phase characteristic of the filter. The second signal so produced is combined with a third signal derived from the amplifier 56 i. e. the output signal of mixer 60, which third signal exhibits the frequency and phase variations characterizing the first signal, to produce a first heterodyne signal having the second phase variations characterizing the second signal i. e. having the phase variations introduced by the filter 62. By means of the mixer 70 the first signal appearing at the output of amplifier 56 is combined with the first heterodyne signal produced by the mixer 64 to produce a second heterodyne signal which is applied to the adder 88. It will be noted that this second heterodyne signal exhibits the frequency variations of the first signal at the output of amplifier 56 and has phase variations equal to the difference between the phase variations exhibited by the first signal and the phase variations exhibited by the first heterodyne signal from the mixer 64 which latter phase variations are brought about by the filter 62.

From the foregoing it will be seen that the novel heterodyning system of the present invention obviates the need for wide band amplifiers having a constant phase shift as a function of frequency, for increasing the level of the generated indexing signal to a usable value. Furthermore, the system herein disclosed has the important advantage that any degree of compensating phase shift may be applied to the processed indexing signal so that an indexing signal having no phase shift or a predetermined controlled phase shift may be produced.

While I have described my invention in a specific embodiment and by means of specific examples, I do not wish to be limited thereto for obvious modifications will occur to those skilled in the art without departing from the spirit and scope of the invention.

What I claim is:

1. An electrical system comprising a source of a first signal having a first given nominal frequency value and undergoing frequency variations about said nominal frequency value and having phase variations determined by the said frequency variations, means to derive from said first signal a second signal having a second nominal frequency value and having frequency variations about said second nominal frequency value determined by the frequency variations of said first signal, said second signal having first phase variations determined by the phase variations of said first signal and having second phase variations determined by the frequency variations of said first signal and by said deriving means, means to derive a first heterodyne signal from said second signal and a third signal having a third nominal frequency value and frequency variations about said third nominal frequency value and phase variations as determined by the frequency and phase variations of said first signal, said first heterodyne signal having a fourth nominal frequency value and having phase variations determined by the said second phase variations of said second signal, and means to combine said first signal and said first heterodyne signal to produce a second heterodyne signal having a fifth nominal frequency value, said second heterodyne signal having frequency variations about said fifth nominal value determined by the said first mentioned frequency variations and having phase variations substantially equal to the difference between the phase variations of said first signal and the phase variations of said first heterodyne signal.

2. An electrical system as claimed in claim 1 wherein the nominal frequency of said second signal is equal to the nominal frequency of said first signal, wherein the nominal frequency of said first heterodyne signal has a value equal to the difference between the nominal frequencies of said second and third signals, and wherein the nominal frequency of said second heterodyne signal has a value equal to the difference between the nominal frequencies of said first signal and said first heterodyne signal.

3. An electrical system as claimed in claim 1 further comprising means to limit the frequency spectrum of said first heterodyne signal.

4. An electrical system as claimed in claim 1 wherein said source of the first signal comprises a transmission path adapted to produce an output signal having phase variations as determined by the frequency variations of a signal applied thereto, and means to apply to said transmission path an input signal having the said first nominal frequency value and having frequency variations about the said nominal frequency value.

5. An electrical system as claimed in claim 1 wherein said means to derive said second signal from said first signal comprises a transmission path adapted to produce phase variations of a signal applied thereto as determined by the frequency of the said applied signal.

6. An electrical system as claimed in claim 1 wherein said third signal is a heterodyne product of said first signal and of another signal and has a nominal frequency value equal to the difference between the frequencies of said first signal and said other signal, and wherein said second heterodyne signal has a nominal frequency value equal to said difference frequency of said first signal and said other signal.

7. A cathode-ray tube system comprising a cathode-ray tube having a member adapted to intercept charged particles, means to generate charged particles and to direct the same in beam formation towards said intercepting member and means to vary the flow of said particles from said generating means, said intercepting member having first portions thereof arranged in a given geometric configuration and having a first response characteristic upon impingement by said charged particles, said member further having second portions thereof arranged in a second geometric configuration indicative of said first configuration and having a second given response characteristic upon impingement by said particles different from said first characteristic, means to scan said charged particles in beam formation across said intercepting member at a given nominal rate to thereby energize said first and second elemental areas, means to vary the flow of said charged particles from said generating means at a given rate, means to derive from said intercepting member a control quantity determined by the response characteristic of said second portions, said control quantity having a nominal frequency determined by the said rate of varying the flow of said charged particles and by the rate of scanning said second portions and having frequency variations about said nominal frequency determined by variations of the rate of scanning said second portions, a transmission path adapted to produce an output signal having phase variations as determined by frequency variations of a signal applied to the input thereof, said transmission path being coupled to said control quantity deriving means and producing at the output thereof a first signal at the said nominal frequency of said control quantity and having frequency variations determined by the frequency variations of said control quantity, means to derive from said first signal a second signal having a second nominal frequency value and having frequency and phase variations determined by the frequency and phase variations of said first signal, means to derive from said first signal a third signal having a third nominal frequency value and having frequency and first phase variations determined by the frequency and phase variations of said first signal and having second phase variations determined by the frequency variations of said first signal and by the phase characteristics of said third signal deriving means, means to combine said second and third signals to produce a first heterodyne signal having a fourth nominal frequency value and having phase variations determined by the said second phase variations of said third signal, and means to combine said first signal and said first heterodyne signal to produce a second heterodyne signal having a fourth nominal frequency value, said second heterodyne signal having frequency variations about said fourth nominal value substantially equal to the first mentioned frequency variations and having phase variations equal to the difference between the phase variations of said first signal and the phase variations of said first heterodyne signal.

8. A cathode-ray tube system as claimed in claim 7 wherein the said second phase variations of said third signal are substantially equal to the phase variations of said first signal.

9. A cathode-ray tube system as claimed in claim 7 wherein the said second phase variations of said third signal are greater than the phase variations of said first signal.

10. A cathode-ray tube system as claimed in claim 7 wherein said second signal is a heterodyne product of the said first signal and of another signal having a nominal frequency proportional to the said rate of varying the flow of said charged particles, wherein the nominal frequency of said first heterodyne signal has a value equal to the difference between the nominal frequencies of said second and third signals, and wherein the nominal frequency of said second heterodyne signal has a value equal to the difference between the nominal frequencies of said first signal and said first heterodyne signal.

11. A cathode-ray tube system as claimed in claim 7 further comprising means to couple said second heterodyne signal to said cathode-ray tube to further vary the flow of said charged particles at a rate determined by the frequency of said second heterodyne signal.

12. A cathode-ray tube system comprising a cathode-ray tube having a member adapted to intercept charged particles, means to generate charged particles and to direct the same in beam formation towards said intercepting member and means to vary the flow of said particles from said generating means, said intercepting member having first elemental areas thereof arranged in a given geometric configuration and having a first response characteristic upon impingement by said charged particles, said member further having second elemental areas thereof arranged in a second geometric configuration indicative of said first configuration and having a second given response characteristic upon impingement by said particles different from said first characteristic, means to scan said charged particles in beam formation across said intercepting member at a given nominal rate to thereby energize said first and second elemental areas, means to vary the flow of said charged particles from said generating means at a given rate, means to derive from said intercepting member a control quantity determined by the response characteristic of said second portions, said control quantity having a nominal frequency determined by the said rate of varying the flow of said charged particles and by the rate of scanning said second portions and having frequency variations about the said nominal frequency determined by variations of the rate of scanning said second portions, a frequency selective amplifier system having a bandpass characteristic adapted to transmit said control quantity and attenuate signals having frequency values circumjacent to the frequency values of said control quantity, means to supply said control quantity to said amplifier system to produce a first signal having a nominal frequency and frequency variations equal to the nominal frequency and frequency variations of said control quantity and having phase variations as determined by the frequency variations of said control quantity, means to combine said first signal and a wave having a nominal frequency value equal to the said rate of varying the intensity of flow of said charged particles to produce a first heterodyne signal having a nominal frequency equal to the difference between the nominal frequencies of said first signal and said wave, said heterodyne signal having frequency and phase variations as determined by the frequency and phase variations of the said first signal, a transmission path adapted to produce an output signal having phase variations as determined by the frequency variations of an applied input signal, means for coupling said transmission path to the output of said amplifying system to produce a second signal having nominal frequency and first phase variations equal to the nominal frequency and phase variations of said first signal and having second phase variations determined by said transmission path and by the frequency variations of said first signal, means to combine said second signal and said first heterodyne signal to produce a second heterodyne signal having a nominal frequency equal to the difference between the nominal frequencies of said second signal and the said first heterodyne signal and having phase variations substantially equal to the said second phase variations of said second signal, a transmission path adapted to limit the frequency spectrum of said second heterodyne signal, means to combine said first signal and said spectrum limited second heterodyne signal to produce a third heterodyne frequency signal having a nominal frequency equal to the difference between the nominal frequencies of said first signal and of said second heterodyne signal, and means to supply said third heterodyne signal to said cathode-ray tube to further vary the flow of said charged particles at a rate determined by the frequency of said third heterodyne signal.

13. A cathode-ray tube system as claimed in claim 12 wherein said wave having a nominal frequency value equal to the said rate of varying the intensity flow of said charged particles has amplitude and phase variations indicative of desired variations of the said characteristic of said first elemental areas.

14. A cathode-ray tube system for reproducing a color television image as defined by a color video wave having first and second components indicative of visual aspects of said image, comprising a cathode-ray tube having an electron beam intercepting member, means to generate electrons and to direct the same in beam formation towards said beam intercepting member and means to vary the flow of electrons from said generating means, said intercepting member comprising first portions each comprising a plurality of stripes of fluorescent material arranged in substantially parallel relationship, said stripes being adapted to produce light of different colors in response to electron impingement, said member further comprising second portions spaced apart substantially parallel to said fluorescent stripes and having a response characteristic upon electron impingement different from the response characteristic of said first portions, means to scan said electrons in beam formation across said beam intercepting member at a given nominal rate to thereby energize said first and second portions, a source of a first signal coupled to said tube to vary the flow of electrons from said generating means at a first given frequency, means to derive from said intercepting member a second signal determined by the response characteristic of said second portions, said second signal having a second nominal frequency determined by the frequency of said first signal and by the rate of scanning said second portions and having frequency variations about said second nominal frequency value determined by variations of the rate of scanning said second portions, frequency selective amplifying means energized by said second signal, said amplifying means being adapted to produce a third signal having a nominal frequency and frequency variations equal to the nominal frequency and frequency variations of said second signal and having phase variations determined by said amplifying means and by the said frequency variations of said second signal, a first mixer adapted to produce a first heterodyne difference frequency signal, said mixer being coupled to the output of said amplifying means and being energized by a fourth signal having a nominal frequency equal to the frequency of said first signal, a transmission path coupled to the output of said amplifying means and adapted to produce a fifth signal having a nominal frequency and frequency variations equal to the nominal frequency and frequency variations of said third signal, said fifth signal having first phase variations equal to the phase variations of said third signal and having second phase variations determined by said transmission path and by the frequency variations of said third signal, a second mixer coupled to the said transmission path and to said first mixer and adapted to produce a second heterodyne difference frequency signal, a frequency selective transmission path coupled to said second mixer, a third mixer coupled to the output of said amplifying means and to the output of said frequency selective transmission path adapted to produce a third heterodyne difference frequency signal, and means to apply said third heterodyne signal to said cathode-ray tube to vary the flow of said electrons at a rate determined by the frequency of said third heterodyne signal.

15. A cathode-ray tube system as claimed in claim 14 wherein the said fourth signal energizing said first mixer is characterized by amplitude and phase variations as determined by the said second component of said color video wave, and wherein the said second phase variations of said fifth signal are substantially equal to the phase variations of said third signal.

16. A cathode-ray tube system as claimed in claim 15 further comprising means to apply said first component of said color video wave to said cathode-ray tube to further vary the flow of electrons from said generating means.

References Cited in the file of this patent

UNITED STATES PATENTS

| | | |
|---|---|---|
| 2,530,431 | Huffman | Nov. 21, 1950 |
| 2,545,325 | Weimer | Mar. 13, 1951 |